(12) United States Patent
Su

(10) Patent No.: US 6,980,430 B2
(45) Date of Patent: Dec. 27, 2005

(54) ANCHORING APPARATUS FOR DATA STORAGE DEVICES

(75) Inventor: Tom Su, Taipei (TW)

(73) Assignee: Chenming Mold Ind. Corp., Taipei (TW)

(*) Notice: Subject to any disclaimer, the term of this patent is extended or adjusted under 35 U.S.C. 154(b) by 168 days.

(21) Appl. No.: 10/731,135

(22) Filed: Dec. 10, 2003

(65) Prior Publication Data

US 2005/0128697 A1 Jun. 16, 2005

(51) Int. Cl.[7] .............................................. G06F 1/16
(52) U.S. Cl. ...................................... 361/685; 312/333
(58) Field of Search ........................ 361/385, 724–727; 312/333, 223.1

(56) References Cited

U.S. PATENT DOCUMENTS

| 4,960,384 | A | * | 10/1990 | Singer et al. | ................ | 361/685 |
| 4,979,909 | A | * | 12/1990 | Andrews | .................... | 312/333 |
| 5,332,306 | A | * | 7/1994 | Babb et al. | .................. | 361/685 |
| 5,683,159 | A | * | 11/1997 | Johnson | ...................... | 361/685 |
| 6,313,985 | B1 | * | 11/2001 | Chen et al. | .................. | 361/685 |
| 6,388,875 | B1 | * | 5/2002 | Chen | .......................... | 361/685 |
| 6,600,648 | B2 | * | 7/2003 | Curlee et al. | ............... | 361/685 |
| 6,798,650 | B2 | * | 9/2004 | Reznikov et al. | .......... | 361/685 |

FOREIGN PATENT DOCUMENTS

TW                555045            9/2003

* cited by examiner

Primary Examiner—Lisa Lea-Edmonds
(74) Attorney, Agent, or Firm—Birch, Stewart, Kolasch & Birch, LLP

(57) ABSTRACT

An anchoring apparatus for data storage devices employs a sliding member mounting on a data storage device to enable the data storage device to be anchored on and removed from a computer host. The apparatus includes a sliding member, a plurality of cavities and a dock. The sliding member has coupling members with intervals not mating that of the cavities. Upon depressing the arched sliding member, the coupling members are coupled with the cavities to anchor the sliding member on the data storage device. The sliding member has a sliding section slidable on a sliding track of the dock to allow the data storage device to be slid to a desired location and anchored through a latch mechanism and a coupling mechanism.

10 Claims, 4 Drawing Sheets

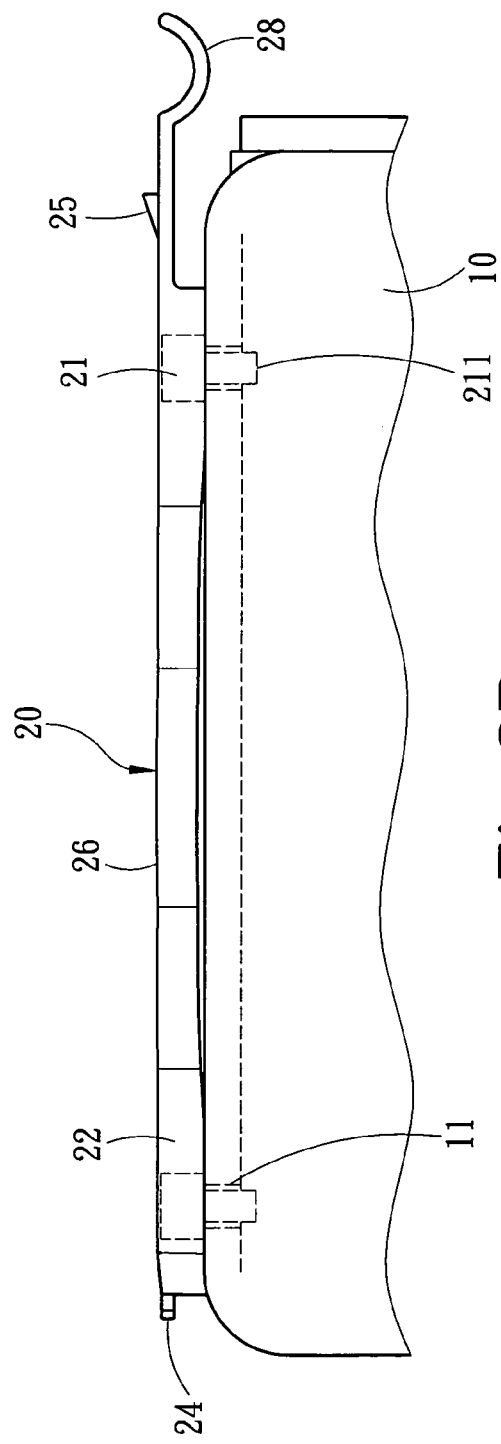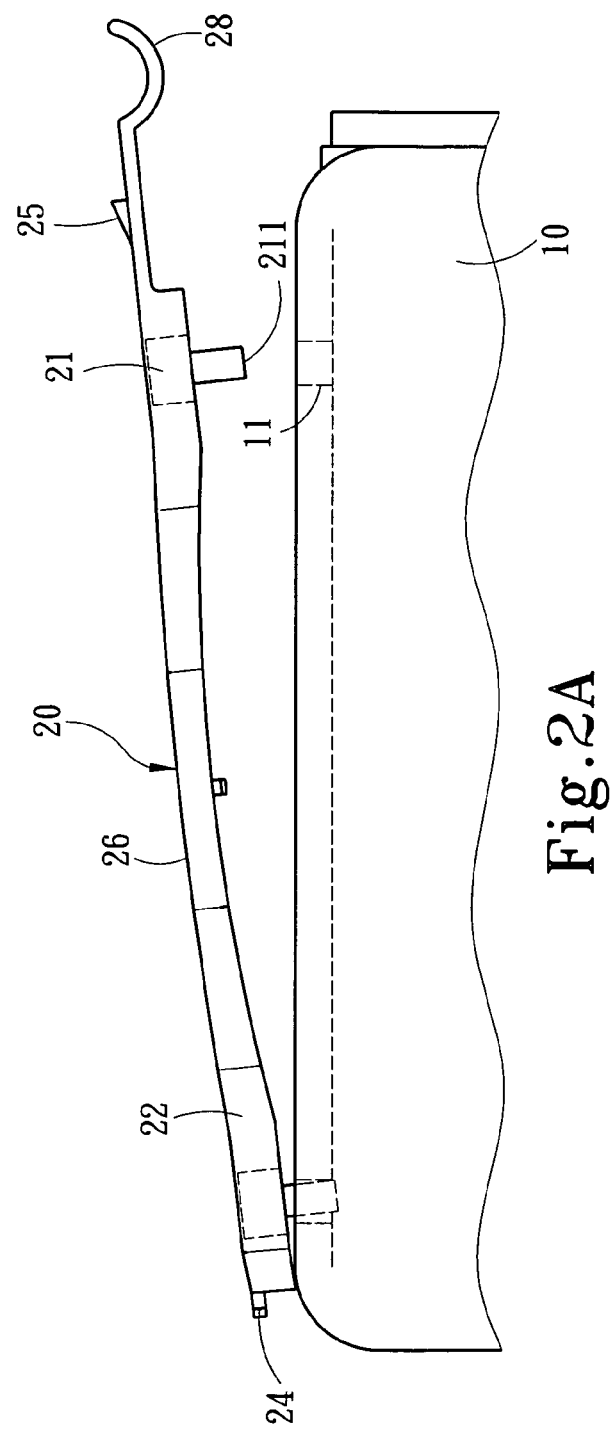
Fig.2B
Fig.2A

ANCHORING APPARATUS FOR DATA STORAGE DEVICES

FIELD OF THE INVENTION

The present invention relates to an anchoring apparatus for data storage devices and particularly to an anchoring apparatus for removing a data storage device as desired from a computer rack.

BACKGROUND OF THE INVENTION

Data storage devices are widely used in personal computers, for example hard disk drives, optical disk drives and the like. They are generally mounted on an anchor rack in the computer case. There are many ways to anchor these data storage devices. The most common approach to fasten data storage devices to the anchor rack uses screws. This approach requires many screws and hand tools such as screwdrivers. This makes it awkward for assembly, repairs, and maintenance. Thus, much time and effort is wasted.

With the advancement in computer design, simpler anchoring apparatus for installing and removing data storage devices have been introduced. Some have sliding flutes on the anchoring rack with sliding rails on two sides of the data storage device to enable the data storage device to be installed and fastened through screws or other means. For instance, ROC patent publication No. 555045 entitled "Anchoring apparatus for data storage devices" discloses such a technique that includes an anchor rack with coupling strip. The anchor rack has a plurality of slots on the sidewalls with fastening holes on two sides and a latch hook on one end. The latch strip is located on one side of the data storage device and has a jutting ring and extension. The jutting ring may slide in the slot, but still requires a latch member on the anchor rack to latch the data storage device. The latch member is made of metal and is coupled to the latch hook. The whole mechanism becomes quite complex, resulting in a more complicated fabrication process and therefore higher cost.

SUMMARY OF THE INVENTION

The primary object of the invention is to provide an anchoring apparatus for data storage devices to facilitate fabrication and assembly. It includes:

a plurality of cavities located on the lateral sides of the data storage device;

a sliding member formed in an arch having a compressing section on the apex of the arch and coupling members at a number matching the number of cavities. The intervals of the coupling members and the cavities do not match with each other. The data storage device and the sliding members are coupled together through the coupling members; and a dock for housing the data storage device including sliding tracks, coupling sections and anchor sections. The anchor sections are latched on the coupling member to anchor the sliding members on the dock. Further, the invention has a compression section, which may be depressed to engage the coupling members with the cavities so that the coupling members are coupled with the cavities of the data storage device. Thereby the sliding member is coupled on the data storage device. The sliding member according to the invention has a simpler design and may be installed and assembled without using any tools.

Another object of the invention is to provide an anchoring apparatus for data storage devices that may be fabricated at a lower cost. The sliding member is made from plastics and costs less than metal. Through the sliding members, the data storage device may be slid and latched to the dock to reduce cost.

The foregoing, as well as additional objects, features and advantages of the invention will be more readily apparent from the following detailed description, which proceeds with reference to the accompanying drawings.

BRIEF DESCRIPTION OF THE DRAWINGS

FIGS. 2A and 2B are schematic views of the present invention showing a sliding member coupling to the data storage device.

DETAILED DESCRIPTION OF THE PREFERRED EMBODIMENT

Figure 3:
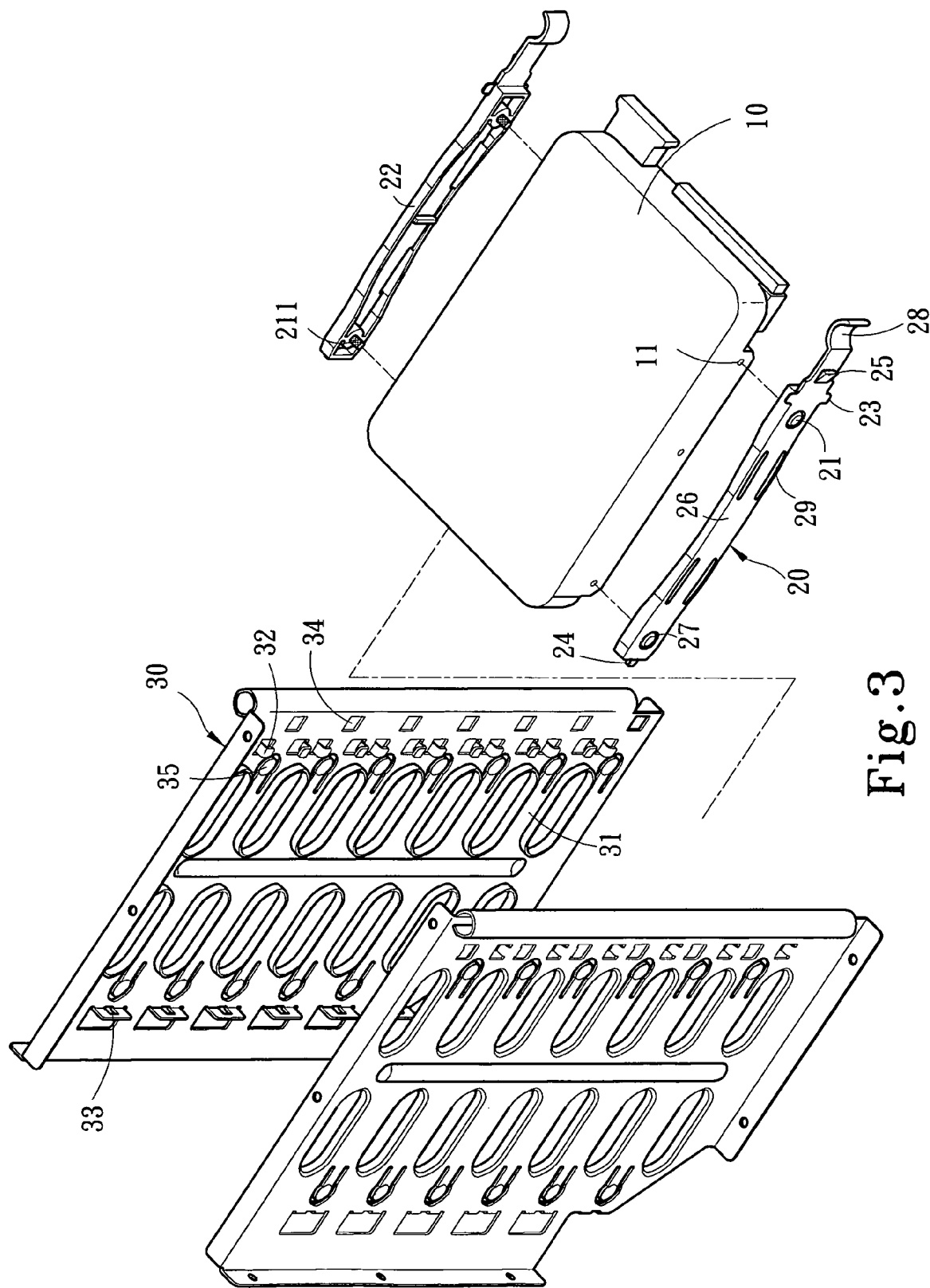
FIG. 3 is an exploded view of the present invention.

Please refer to FIG. 3 for a data storage device 10 and a sliding member 20 coupled through coupling members 21. The sliding member 20 has a sliding section 22, which is slid on a runner 31 of a dock 30. The data storage device 10 is securely mounted via the sliding member 20 having first and second latch members 23 and 24, and latch mechanism 25 engaging with the first and second coupling sections 32 and 33, and a coupling mechanism 34 on the dock 30.

The sliding member 20 includes a compression section 26, a sliding section 22, a plurality of apertures 27, coupling members 21, a retrieval, section 28, the first and second latch members 23 and 24, and a latch mechanism 25. The sliding member 20 is formed in an arch shape and has the compressing section 26 located on the apex of the arch and two sliding sections 22 on two sides thereof. The number of the coupling members 21 matches the number of cavities 11 formed on the data storage device 10. The coupling members 21 are embedded in apertures 27. The intervals of the coupling members 21 and the cavities 11 do not match with each other. The dock 30 has sliding tracks 31, anchor sections 35, a first and second coupling sections 32 and 33, and a coupling mechanism 34. The sliding tracks 31 and sliding sections 22 correspond to each other in terms of the location and shape.

The first latch member 23 is a lug extending from two sides of the sliding member 20. The first coupling section 32 is formed in hooks opposing each other to mate the first latch member 23. The second latch member 24 is a lug extending from one distal end of the sliding member 20. The second coupling section 33 has an opening to engage with the second latch member 24. The latch mechanism 25 is a sloped surface extending from one surface of the sliding member 20. The coupling mechanism 34 is an opening. The latch mechanism 25 and the coupling mechanism 34 may be coupled with each other. The retrieval section 28 is an arch located at the other end opposite to the second latch member 24 to provide a handle for moving the data storage device 10.

Figure 1:
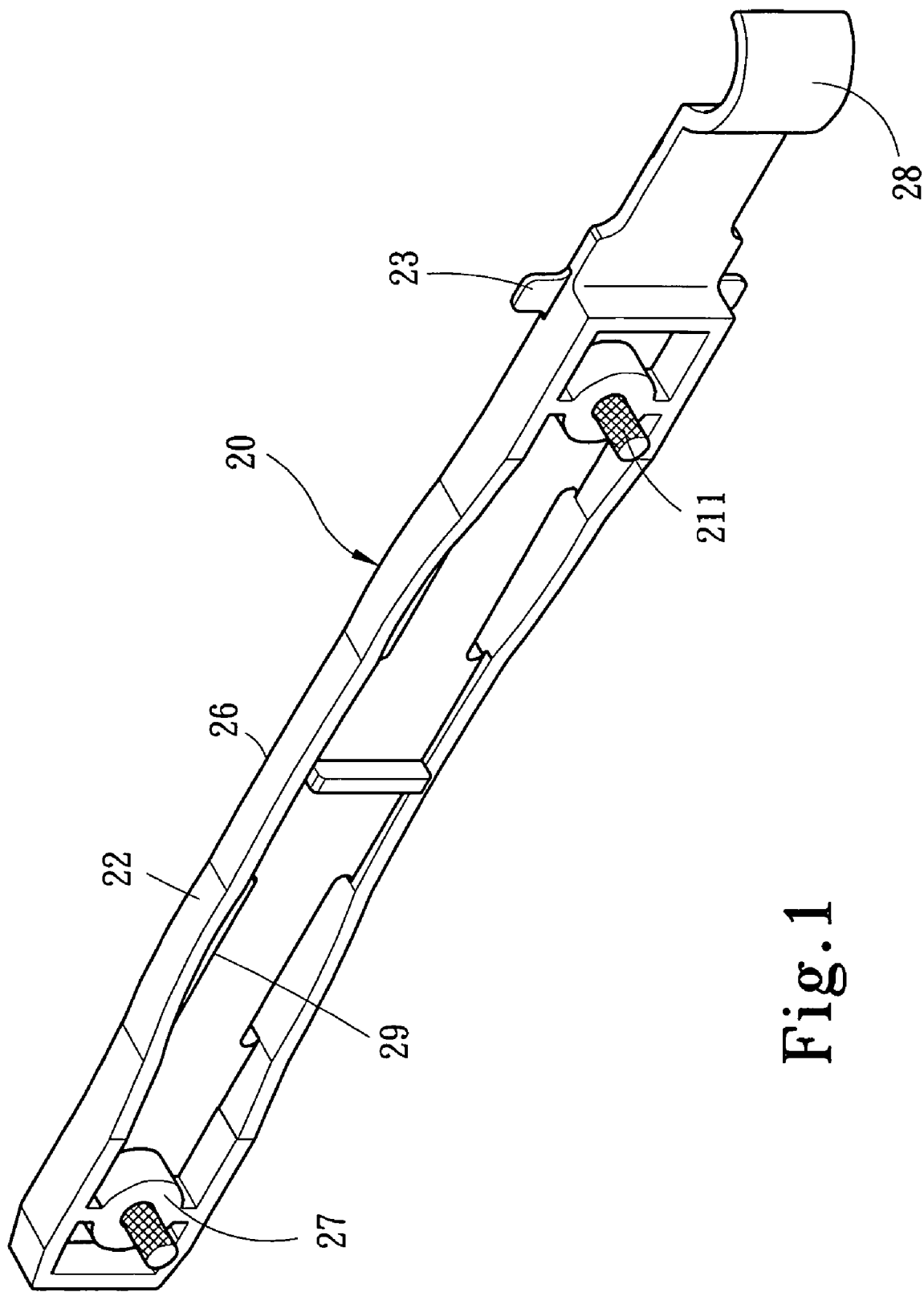
FIG. 1 is a schematic view of a sliding member according to the present invention.

Referring to FIGS. 1, 2A and 2B, when the sliding member 20 and the data storage device 10 are coupled, due to the compression section 26 is on the apex end of the sliding member 20 and is extended from two ends of the sliding member 20 in an arched fashion, and the sliding section 20 further has a damper space 29, and the interval of the coupling members 21 is less than that of the cavities 11 of the data storage device 10, the coupling members 21 of the sliding member 20 may be tightly coupled in the apertures 27. As the coupling members 21 are made of metal and have one end forming a coupling end with an embossed surface, the coupling members 21 may be in contact with the anchor sections 35 of the dock 30 (as shown in FIG. 3) to form grounding to prevent static charge. For coupling, first align the coupling members 21 at two ends of the sliding member 20 with the cavities 11, and depress the compression section 26. As the sliding member 20 is made from plastics and has elasticity, and the sliding member 20 has damper space 29, the sliding member 20 is deformed when the compression section 26 is depressed. Thus all of the coupling members 21 and the cavities 11 may be mated, and the coupling end 211 of the coupling members 21 may be inserted into the cavity 11. With the embossed surface forming a friction force, once the compression section 26 is released, the sliding member 20 may be coupled on the data storage device 10.

Figure 4:
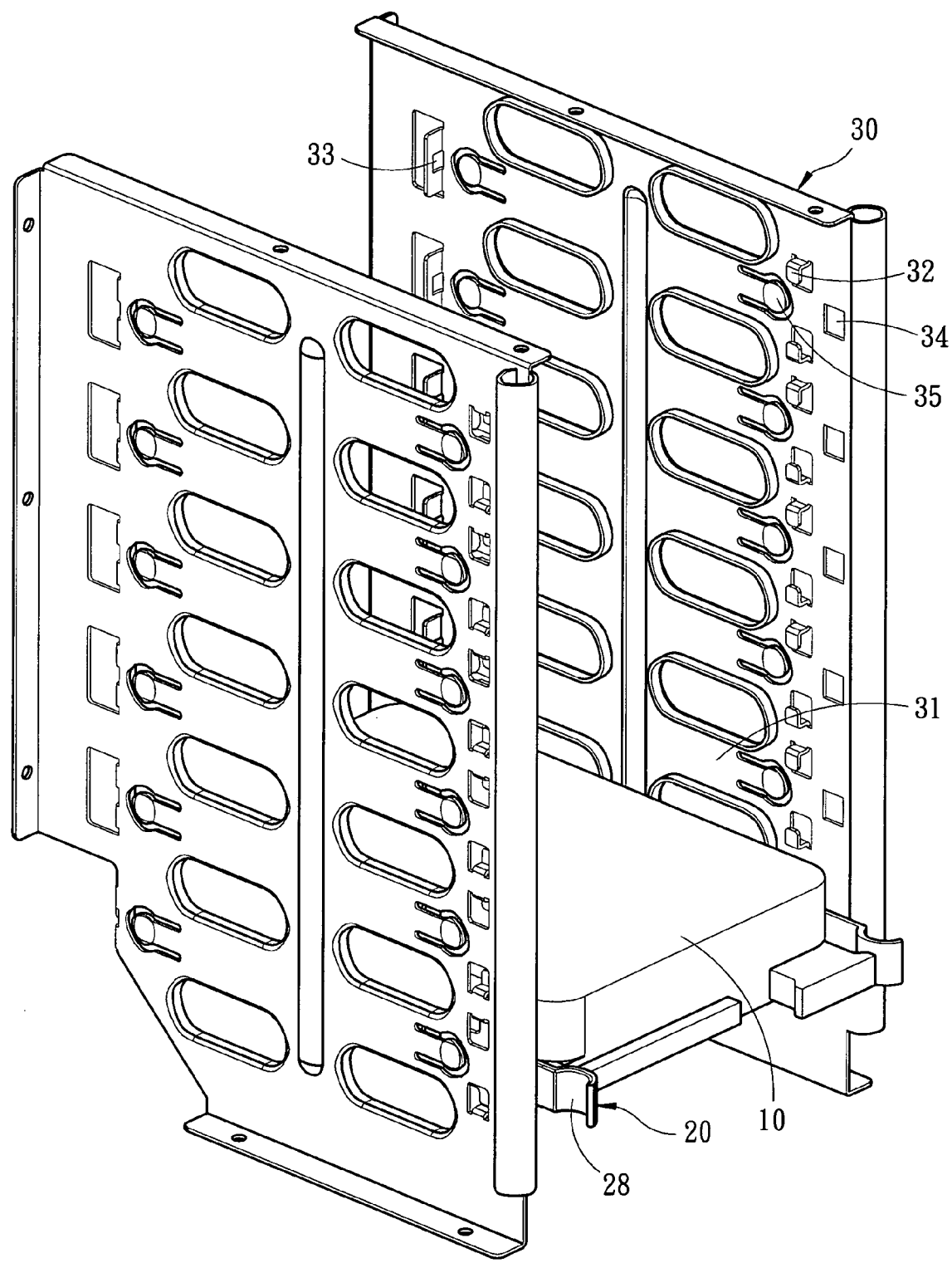
FIG. 4 is a schematic view of the present invention in use.

Referring to FIGS. 3 and 4, sliding of the data storage device 10 and the sliding member 20 is accomplished through the sliding sections 22 of the sliding member 20 and the sliding tracks 31 of the data storage device 10. After the data storage device 10 has been mounted on a desired location, the second latch member 24 of the sliding member 20 runs through the opening of the second coupling member 33, and the lug of the first latch member 23 is latched on the hook type first coupling section 32 so that the sliding member 20 is held without moving up or down. The jutting sloped surface of the latch mechanism 25 is coupled with the coupling mechanism 34, and the coupling members 21 are coupled with the cavities 11. Hence the data storage device 10 is securely mounted on the dock 30. To remove the data storage device 10, depress the retrieval section 28 in the direction towards the data storage device 10 and move outwards, the sloped surface of the latch mechanism 25 is slightly moved out of the coupling mechanism 34. Then the data storage device 10 may be pulled out from the dock 30.

While the preferred embodiment of the invention has been set forth for the purpose of disclosure, modifications of the disclosed embodiment of the invention as well as other embodiments thereof may occur to those skilled in the art. Accordingly, the appended claims are tended to cover all embodiments which do not depart from the spirit and scope of the invention.

What is claimed is:

1. An anchoring apparatus for data storage devices to anchor a data storage device on a computer host, comprising:
    a plurality of cavities located on lateral sides of the data storage device;
    a sliding member including a compression section, a sliding section, a plurality of coupling members and a latch mechanism, the sliding member being formed in an arched shape, the compressing section being located on the apex of the sliding member, the sliding section being located on two sides of the sliding member, the number of the coupling members mating the number of the cavities, the intervals of the coupling members not mating that of the cavities, the compression section being depressible to deform the sliding member to allow the coupling members to match the cavities so that the coupling members and the cavities are engaged to couple the sliding member with the data storage device; and
    a dock for housing the data storage device having a sliding track, a anchor section and a coupling mechanism, the sliding track mating the sliding section and the coupling mechanism mating the latch mechanism in terms of shapes and locations, the coupling members being latchable on the anchor section to allow the sliding member to be coupled on the dock.

2. The anchoring apparatus of claim 1, wherein the coupling member has a coupling end latchable on the cavity of the data storage device, the coupling end being embossed with desired traces.

3. The anchoring apparatus of claim 1, wherein the sliding member has a retrieval section formed in an arched shape.

4. The anchoring apparatus of claim 1, wherein the latch mechanism is a sloped surface extending from a surface of the sliding member to couple with the coupling mechanism.

5. The anchoring apparatus of claim 1, wherein the latch mechanism further includes a first latch member formed in a lug extending from two lateral ends of the sliding member and the coupling mechanism has a first coupling section formed in hooks opposing each other to couple with the first latch member.

6. The anchoring apparatus of claim 1, wherein the latch mechanism further includes a second latch member formed in a lug extending from a distal end of the sliding member and the coupling mechanism has a second coupling section formed in an opening in the center thereof to couple with the second latch member.

7. The anchoring apparatus of claim 1, wherein the sliding member is made from plastics.

8. The anchoring apparatus of claim 1, wherein the sliding member has a plurality of apertures for housing the coupling members.

9. The anchoring apparatus of claim 1, wherein the coupling members are made of metal.

10. The anchoring apparatus of claim 1, wherein the sliding member further has a damper space to generate the deformation of the sliding member when depressed.

* * * * *